Inventor:
Victor James Cooper:
By his attorneys,
Baldwin, Wight & Provost

Nov. 2, 1954 V. J. COOPER 2,693,500

TELEVISION AND LIKE TRANSMITTER

Filed Aug. 1, 1949 2 Sheets-Sheet 2

Inventor:
Victor James Cooper;
By his attorneys,
Baldwin, Wight & Prevost 2,693,500

TELEVISION AND LIKE TRANSMITTER

Victor James Cooper, Writtle, England, assignor to Marconi's Wireless Telegraph Company Limited, London, England, a company of Great Britain Application August 1, 1949, Serial No. 107,981

Claims priority, application Great Britain August 10, 1948

2 Claims. (Cl. 178—7.1)

This invention relates to television and like transmitters and more particularly to such transmitters of the kind in which picture or like signals are transmitted as variations on one side of a predetermined level and synchronizing signals are transmitted as variations on the other side of said level. Typical modern practice in such systems is usually to transmit picture or like signals and synchronizing signals so that the latter correspond to "blacker than black", the picture signals starting at "black" level and extending to "white".

It is obviously very desirable in transmitters of the kind referred to that the predetermined level shall be properly stabilized and a very high degree of constancy of such level is often required. The present invention seeks to satisfy this requirement in a simple manner and to provide transmitters of the kind referred to wherein the said level can be automatically maintained to an accuracy (if desired) of $\pm 1\%$ or thereabouts.

According to this invention a television or like transmitter of the kind referred to comprises means for deriving from the modulated output from said transmitter a control voltage which is a function of the predetermined level actually produced and means for utilizing said voltage to control the modulation of the transmitter to maintain said level closely at a predetermined value.

Preferably the means for deriving the control voltage include means, controlled by the synchronizing signals, for deriving signals proportional to the instantaneous transmitted amplitudes at short periods of time at the transitions from synchronizing signals to picture signals or vice versa, when the level should be the predetermined level, and utilizing said signals to produce the control voltage. Preferably a gating stage, "opened" for a short period at the end of each synchronizing signal by a voltage synchronized by the synchronizing signals is employed, and signals obtained by rectifying the output from the transmitter are applied to said gating stage, the signals passed thereby being employed to produce the control voltage.

Figure 1:
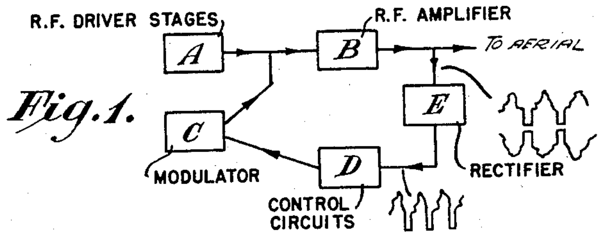
Figure 3:
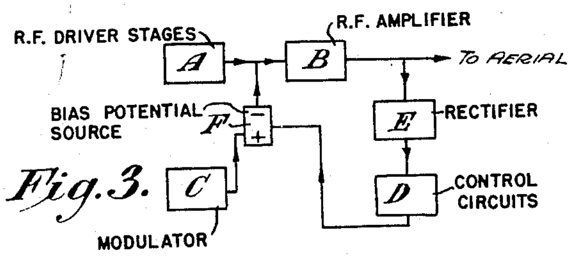
Figure 4:
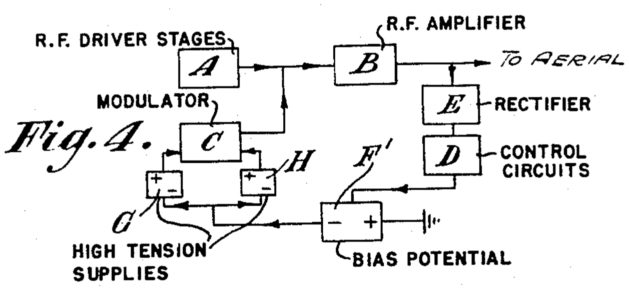
Figure 5:
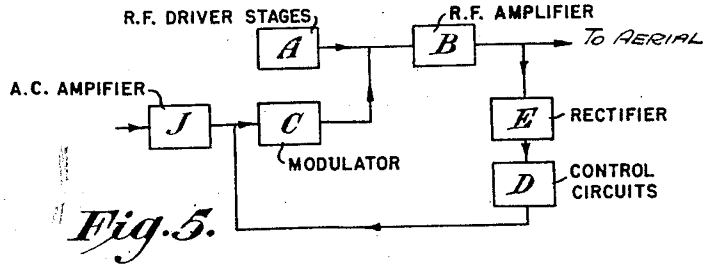
Figure 2:
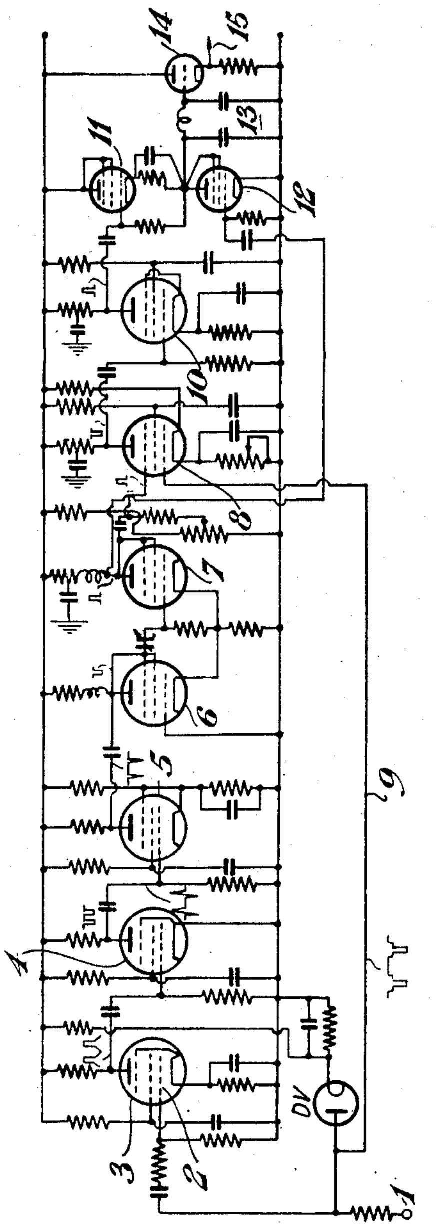

The invention is illustrated in the accompanying drawings in which Figure 1 is a general block diagram of one embodiment of the invention; Fig. 2 is a circuit diagram showing one form of control circuit arrangement which may be used; and Figs. 3, 4 and 5 are block diagrams of modifications.

Referring to Fig. 1 a television transmitter with synchronizing signals in the "blacker than black" direction comprises the usual radio frequency (R. F.) driver stages represented by the block A which provide carrier input to the grid modulated R. F. amplifier in block B to which picture and synchronizing signals are also applied from a modulator in block C as in the usual well known way. In accordance with this invention the modulation is subject to control by suitable control circuits (to be more fully described later herein) in block D which control the said modulator so as to maintain the "black" level substantially constant and are themselves controlled by rectified signals rectified by apparatus in block E and derived from the output channel between the grid modulated R. F. amplifier B and the usual transmitter aerial system (not shown).

The control circuits at D in Fig. 1 are represented diagrammatically in more detail in Fig. 2. Here modulated output from the R. F. amplifier at B in Fig. 1 is fed to the rectifier E of Fig. 1 (B and E are not shown in Fig. 2) the resultant output from which is fed in at terminal 1 (Fig. 2) to the control grid 2 of a signal inverter or phase reverser valve 3 followed by a pulse amplifier and signal separating valve 4 which passes only the synchronizing signals. The output from this valve is differentiated by a resistance-capacity differentiating circuit, the peaked output from which is fed to a valve 5 arranged in manner well known per se to provide an output consisting of signal peaks occurring at the trailing edges only of the original synchronizing signals. These signal peaks are fed to control a so-called Schmitt type two-valve relay comprising valves 6 and 7, or a similar multi-vibrator or like device arranged, also in manner well known per se, to produce a short pulse commencing at the occurrence of each of said signal peaks. This multi-vibrator forms a convenient means for changing sharp short peaks, such as are shown to the right of valve 5 in Fig. 2 into definite short pulses, such as are shown above valve 6 in the said figure and which are suitable for effecting gating control as will be described later herein. Clearly, since the sharp short peaks are fed to the grid of the valve 6 the multi-vibrator consisting of values 6 and 7 will be synchronized thereby. To quote practical figures, if there is a period of 5 micro-seconds between the trailing edge of one synchronizing (line) signal and the next, each short pulse may have a length of approximately 1 micro-second. These short pulses are applied to provide "opening" control of a gating valve 8 the gated input of which is taken over connection 9 from the output circuit of the rectifier in block E of Fig. 1 (not shown in Fig. 2), rectifying the modulated output from the grid modulated R. F. amplifier at block B of Fig. 1 (also not shown in Fig. 2). The diode DV is a normal limiter diode serving to cut off the positive peaks of the composite signal from the rectifier E (not shown in Fig. 2) which drive the diode anode positive and thus render said diode conductive. As will now be seen the gating valve 8 will pass rectified signals for a short period after each synchronizing signal at a time when the level should be the predetermined "black" level. The peak value of the signal from the gating valve is smoothed to a steady DC level by a low pass filter and amplified as required, thus producing a steady DC potential proportional to the "black" level actually obtained. As shown in Fig. 2 there is an amplifier valve 10 followed by serially connected valves 11, 12 controlled respectively by the valves 10 and 7 feeding via a low pass filter 13 into a cathode follower valve 14. As this part of the circuit is as well known per se and forms no part of the present invention it requires no further description herein beyond pointing out that the valve 11, when conductive under the control of valve 10, acts as a charging resistance through which the first (left hand in Fig. 2) condenser in the filter 13 is charged and the valve 12, when conductive under the control of valve 7, shorts out the said condenser in accordance with well known practice. The DC potential which appears at lead 15 is used as the control potential controlling the modulation to maintain the desired constant level. In order that the operation of the arrangement may be better understood conventional representations of the wave forms appearing at different parts of the circuits are given in Figs. 1 and 2.

The control potential may effect the required control in any of a variety of different ways. Thus, for example, as represented in block diagram form in Fig. 3 it may be used to control electronically the value of a bias potential provided by a source represented by block F said potential being superimposed in the lead between the modulator at C and the input circuit of the grid modulated R. F. amplifier at B, the control being, of course, in the direction to resist change of the "black" level.

In another arrangement as represented in block diagram form in Fig. 4 the DC level for "black" may be established in the modulator itself (which in this case is DC connected) by splitting the HT supplies therefor into two represented respectively by blocks G and H and "floating" these supplies by an electronically controlled bias potential supplied from a source at F′ and controlled by the control voltage from D.

In a further arrangement represented in block diagram form in Fig. 5 there is an AC coupled amplifier at J followed by a DC connected modulator at C to the input of which the control voltage from D is applied to produce the required control. As the invention is not concerned with the details of the circuits by which the control voltage exercises the required control, and as there are many circuits, well known per se to those skilled in the art, obviously adaptable for the purpose, further description of this portion of the apparatus is deemed unnecessary.

It may be noted that the arrangements described will readily handle changes up to a frequency of several kilocycles per second and that, accordingly, they will also give partial compensation for low frequency distortion due to inadequate load regulation of voltage supplies. This is a substantial advantage since it enables these supplies—and especially the main HT supply to the final modulated R. F. amplifier—to be less strictly regulated than would otherwise be necessary, with resulting substantial economy in apparatus.

I claim:

1. A transmitter of the kind in which video signals are transmitted as variations on one side of a predetermined carrier level and synchronizing signals are transmitted as variations on the other side of said level, an output circuit for said transmitter, a modulator for said transmitter, control voltage means connected to said output circuit and responsive to the modulated output therefrom at instances of occurrence of édges of said synchronizing signals to produce a control voltage which is a function of the level actually produced in said output circuit at said instances of occurrence and modulation control means controlling said modulator of the transmitter and responsive to said control voltage to maintain said level closely at a predetermined value, wherein the means controlled by the synchronizing signals for deriving signals proportional to the instantaneous transmitted amplitudes, and for utilizing said derived signals to produce the control voltage, include agating stage, means controlled by a voltage synchronized by the synchronizing signals for "opening" said stage for a short period at the end of each synchronizing signal, a rectifier for rectifying the output from the transmitter, a circuit for applying the rectified signals to said gating stage, and means utilizing the signals passed by said gating stage to produce the control voltage, said control voltage being a derived direct current control potential proportional to the level actually produced on being employed to control electronically the value of a bias potential on which is "floated" two high tension power supplies provided for the modulator of the transmitter.

2. A transmitter of the kind in which video signals are transmitted as variations on one side of a predetermined carrier level and synchronizing signals are transmitted as variations on the other side of said level, an output circuit for said transmitter, a modulator for said transmitter, control voltage means connected to said output circuit and responsive to the modulated output therefrom at instances of occurrence of edges of said synchronizing signals to produce a control voltage which is a function of the level actually produced in said output circuit at said instances of occurrence and modulation control means controlling said modulator of the transmitter and responsive to said control voltage to maintain said level closely at a predetermined value, wherein the means controlled by the synchronizing signals for deriving signals proportional to the instantaneous transmitted amplitudes, and for utilizing said derived signals to produce the control voltage, include a gating stage, means controlled by a voltage synchronized by the synchronizing signals for "opening" said stage for a short period at the end of each synchronizing signal, a rectifier for rectifying the output from the transmitter, a circuit for applying the rectified signals to said gating stage, and means for utilizing the signals passed by said gating stage to produce the control voltage, said control voltage being a derived direct current control potential proportional to the level actually produced on being employed to control a direct current connected modulator arranged to follow an alternating current coupled amplifier excited by the signal to be transmitted.

References Cited in the file of this patent

UNITED STATES PATENTS

| Number | Name | Date |
|---|---|---|
| 2,190,753 | Brown et al. | Feb. 20, 1940 |
| 2,224,134 | Blumlein | Dec. 10, 1940 |
| 2,244,240 | Blumlein | June 3, 1941 |
| 2,307,375 | Blumlein et al. | Jan. 5, 1943 |
| 2,328,946 | Blumlein | Sept. 7, 1943 |